(12) United States Patent
Simpson et al.

(10) Patent No.: US 10,006,321 B2
(45) Date of Patent: Jun. 26, 2018

(54) ENGINE VARIABLE CAMSHAFT TIMING PHASER WITH PLANETARY GEAR SET

(71) Applicant: BorgWarner Inc., Auburn Hills, MI (US)

(72) Inventors: Roger Simpson, Ithaca, NY (US); Michael Close, Apalachin, NY (US); Thomas Benner, Lansing, NY (US)

(73) Assignee: BorgWarner, Inc., Auburn Hills, MI (US)

(*) Notice: Subject to any disclaimer, the term of this patent is extended or adjusted under 35 U.S.C. 154(b) by 0 days. days.

(21) Appl. No.: 15/507,776

(22) PCT Filed: Aug. 24, 2015

(86) PCT No.: PCT/US2015/046464
§ 371 (c)(1),
(2) Date: Mar. 1, 2017

(87) PCT Pub. No.: WO2016/036528
PCT Pub. Date: Mar. 10, 2016

(65) Prior Publication Data
US 2017/0248047 A1  Aug. 31, 2017

Related U.S. Application Data

(60) Provisional application No. 62/045,713, filed on Sep. 4, 2014.

(51) Int. Cl.
*F01L 1/352* (2006.01)
*F01L 1/344* (2006.01)
*F01L 1/34* (2006.01)

(52) U.S. Cl.
CPC .............. *F01L 1/352* (2013.01); *F01L 1/34* (2013.01); *F01L 1/344* (2013.01)

(58) Field of Classification Search
CPC ......... F01L 1/352; F01L 1/34; F01L 2250/06; F01L 2820/032; F16H 1/32; F16H 1/28; F16H 57/082; F16H 2001/2872
(Continued)

(56) References Cited

U.S. PATENT DOCUMENTS 5,680,837 A   10/1997  Pierik
6,027,424 A   2/2000   Reynolds
(Continued)

FOREIGN PATENT DOCUMENTS

CN    103982262 A    8/2014
EP        2006501 A1   12/2008
(Continued)

OTHER PUBLICATIONS

First Office Action for PCT/US2015/046464/201580045906.8 dated Jul. 17, 2017, by the State Intellectual Property Office of China.
(Continued)

*Primary Examiner* — Jason T Newton (57) ABSTRACT

An engine variable camshaft timing phaser (10) includes a sprocket (12) and a planetary gear set (14). The sprocket (12) receives rotational drive input from an engine crankshaft. The planetary gear set (14) includes two or more ring gears (34, 36), multiple planet gears (32), a sun gear (30), a first set of teeth (82), and a second set of teeth (40, 62). One of the ring gears (34, 36) can be connected to the sprocket (12) and one of the ring gears (34, 36) transmits rotational drive output to an engine camshaft. The sun gear (30) engages with the planet gears (32) and is driven by an electric motor (38). In order to bring the planetary gear set (14) to a locked condition, the first set of teeth (82) and the second set of teeth (40, 62) are mated with each other.

15 Claims, 5 Drawing Sheets

(58) Field of Classification Search
USPC .................................................... 123/90.15
See application file for complete search history.

(56) References Cited

U.S. PATENT DOCUMENTS

| | | | | |
|---|---|---|---|---|
| 6,129,061 | A * | 10/2000 | Okuda | F01L 1/352 |
| | | | | 123/90.17 |
| 7,506,623 | B2 * | 3/2009 | Schafer | F01L 1/352 |
| | | | | 123/90.11 |
| 9,810,108 | B2 * | 11/2017 | Pritchard | F01L 1/348 |
| 9,810,109 | B2 * | 11/2017 | Pluta | F01L 1/352 |
| 2006/0236965 | A1 | 10/2006 | Schaefer et al. | |
| 2012/0186548 | A1 * | 7/2012 | David | F01L 1/352 |
| | | | | 123/90.17 |
| 2017/0145873 | A1 * | 5/2017 | Pluta | F01L 1/352 |
| 2017/0198755 | A1 * | 7/2017 | Brown | F16D 3/10 |
| 2017/0248045 | A1 * | 8/2017 | Pritchard | F01L 1/348 |
| 2017/0254235 | A1 * | 9/2017 | Pluta | F01L 1/352 |

FOREIGN PATENT DOCUMENTS

| | | | | |
|---|---|---|---|---|
| EP | EP 2006501 A1 * | 12/2008 | | F01L 1/352 |
| JP | 2003120227 A1 | 4/2003 | | |

OTHER PUBLICATIONS

Search Report for PCT/US2015/046464/201580045906.8 dated Jul. 7, 2017, by the State Intellectual Property Office of China.
International Search Report for PCT/US2015/046464 dated Oct. 26, 2015.

* cited by examiner

ENGINE VARIABLE CAMSHAFT TIMING PHASER WITH PLANETARY GEAR SET

This application claims the benefit of U.S. Provisional Ser. No. 62/045,713 filed on Sep. 4, 2014, the entire contents of which are hereby incorporated by reference.

TECHNICAL FIELD

The present disclosure generally relates to variable valve timing (VVT) for internal combustion engines, and more particularly relates to variable camshaft timing (VCT) phasers.

BACKGROUND

Variable valve timing (VVT) systems are commonly used with internal combustion engines—such as those found in automobiles—for controlling intake and exhaust valve opening and closing. The VVT systems can help improve fuel economy, reduce exhaust emissions, and enhance engine performance. One type of VVT system employs a variable camshaft timing (VCT) phaser. In general, VCT phasers dynamically adjust the rotation of engine camshafts relative to engine crankshafts in order to advance or retard the opening and closing movements of intake and exhaust valves.

SUMMARY

In one embodiment, an engine variable camshaft timing phasing includes a sprocket and a planetary gear set. The sprocket receives rotational drive input from an engine crankshaft. The planetary gear set includes two or more ring gears, multiple planet gears, a sun gear, a first set of teeth, and a second set of teeth. One ring gear receives rotational drive input from the sprocket, and one ring gear transmits rotational drive output to an engine camshaft. Each of the planet gears is engaged with the ring gears. The sun gear is engaged with each of the planet gears and is driven by an electric motor. In order to bring the planetary gear set to a locked condition, the first set of teeth and the second set of teeth are mated with each other.

In another embodiment, an engine variable camshaft timing phaser includes a sprocket, two or more ring gears, multiple planet gears, a carrier plate, and a sun gear. The sprocket receives rotational drive input from an engine crankshaft. One ring gear receives rotational drive input from the sprocket, and one ring gear transmits rotational drive output to an engine camshaft. Each of the planet gears is engaged with the ring gears. The carrier plate supports the planet gears and has a first set of teeth. The sun gear is engaged with each of the planet gears and is driven by an electric motor. The sun gear has a second set of teeth. The sun gear and the electric motor have a pin-and-recess interconnection between them. The recess has a first axial depth with respect to the pin, and has a second axial depth with respect to the pin. When the engine variable camshaft timing phaser is in a non-advancing and non-retarding state, the first set of teeth and the second set of teeth are mated with each other, and the pin is situated at the first axial depth of the recess. And when the engine variable camshaft timing phaser is in an advancing or retarding state, the first set of teeth and the second set of teeth are unmated from each other, and the pin is situated at the second axial depth of the recess.

In yet another embodiment, an engine variable camshaft timing phaser includes a sprocket, two or more ring gears, multiple planet gears, a first set of teeth, a sun gear, and a spring. The sprocket receives rotational drive input from an engine crankshaft. One ring gear receives rotational drive input from the sprocket, and one ring gear transmits rotational drive output to an engine camshaft. Each of the planet gears is engaged with the ring gears. The sun gear is engaged with the planet gears and is driven by an electric motor. The sun gear has a second set of teeth and has a wall with a recess located in it. The recess has a first depression, a second depression, and a third depression. When a pin of the electric motor is seated in the first depression, the sun gear is at a first axial position along its axis and the first set of teeth and the second set of teeth are mated with each other. When the pin is seated in the second depression, the sun gear is at a second axial position along its axis and the first set of teeth and the second set of teeth are unmated from each other. And when the pin is seated in the third depression, the sun gear is at the second axial position along its axis and the first set of teeth and the second set of teeth are unmated from each other. The spring biases the sun gear toward the pin of the electric motor.

DETAILED DESCRIPTION

The figures illustrate embodiments of a variable camshaft timing phaser 10 (hereafter "phaser") that is equipped in an internal combustion engine and that controls intake and exhaust valve opening and closing in the engine. The phaser 10 dynamically adjusts the rotation of the engine's camshaft relative to the engine's crankshaft in order to advance or retard the opening and closing movements of the intake and exhaust valves. Internal combustion engines are perhaps most commonly found in automobiles, but are also found in other applications. While described in greater detail below, in general, gears of the phaser 10 can be brought to a locked condition where the engine's camshaft is maintained at its angular position relative to the engine's camshaft when locked. The locked condition precludes a behavior known as "drift" in which the engine's camshaft tends to rotate from its angular position when the engine is shutdown. As an aside, the terms axially, radially, circumferentially, and their related forms are used herein with reference to the generally circular and annular and cylindrical components of the phaser 10, unless otherwise indicated.

The phaser 10 is a multi-piece assembly with components that work together to transfer rotation from the accompanying engine's crankshaft and to the engine's camshaft, and that can work together to angularly displace the camshaft relative to the crankshaft for advancing and retarding engine valve opening and closing. The phaser 10 can have different designs and constructions depending upon, among other possible factors, the application in which the phaser is employed and the crankshaft and camshaft that it works with. In the embodiment presented in FIGS. 1-4, for example, the phaser 10 includes a sprocket 12, a planetary gear set 14, an inner plate or plate 16, and a spring 18.

The sprocket 12 receives rotational drive input from the engine's crankshaft and rotates about an axis Xi. A timing chain or a timing belt can be looped around the sprocket 12 and around the crankshaft so that rotation of the crankshaft translates into rotation of the sprocket via the chain or belt. Other techniques for transferring rotation between the sprocket 12 and crankshaft are possible. At an exterior, the sprocket 12 has a set of teeth 20 for mating with the timing chain, with the timing belt, or with another component. In different examples, the set of teeth 20 can include thirty-eight individual teeth, forty-two individual teeth, or some other quantity of teeth spanning continuously around the circumference of the sprocket 12. As illustrated, the sprocket 12 has a skirt 22 spanning axially from the set of teeth 20. The skirt 22 is a cylindrical wall that serves to house parts of the planetary gear set 14, and can have a step 24 (FIG. 4) at its interior for accommodating a gear of the planetary gear set. On its other side, the sprocket 12 has a front wall 26 with a central opening 28.

In the embodiment presented here, the planetary gear set 14 includes a sun gear 30, planet gears 32, a first ring gear 34, and a second ring gear 36. The sun gear 30 is driven by an electric motor 38 (FIG. 3) for rotation about the axis Xi. Referring now to FIGS. 5 and 6A-6C, the sun gear 30 engages with the planet gears 32 and has a set of teeth 40 at its exterior that makes direct teeth-to-teeth meshing with the planet gears. In different examples, the set of teeth 40 can include twenty-six individual teeth, thirty-seven individual teeth, or some other quantity of teeth spanning continuously around the circumference of the sun gear 30. A wall 42 in the shape of a cylinder spans from the set of teeth 40 and to an open end 44 that terminates the extent of the wall. As described, the sun gear 30 is an external spur gear, but could be another type of gear.

In this embodiment, a pair of recesses 46 is defined in the wall 42 for receiving a pin 48 of the electric motor 38. Together, the recesses 46 and pin 48 make an interconnection between the sun gear 30 and the electric motor 38. The pin 48 extends from the electric motor 38, can be a part of a drive shaft thereof or can constitute the drive shaft thereof, and can have a pair of prongs 50 projecting in opposite directions. The pin 48 is presented in the figures as a somewhat generic representation; skilled artisans will appreciate that the pin 48 can take many designs and constructions in application. The word "pin" as used herein is intended to encompass the many designs and constructions possible. Although the recesses 46 are provided as a pair on opposing sides of the wall 42, a single recess could instead be provided in the wall or another quantity of recesses could be provided. The recesses 46 are disposed in the open end 44 and constitute a section of the open end; instead, the recesses could be spaced in from the open end and enclosed on its sides by portions of the wall 42.

Figure 6A:
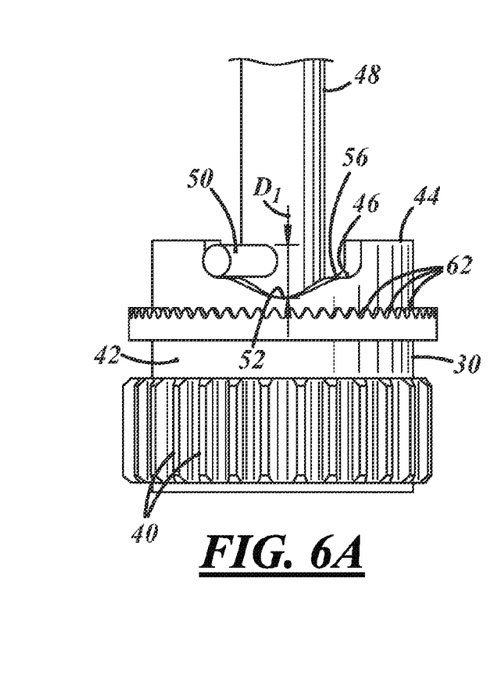
FIGS. 6A-6C depict different conditions of an embodiment of a pin-and-recess interconnection of the engine variable camshaft timing phaser of FIG. 1.
Figure 6B:
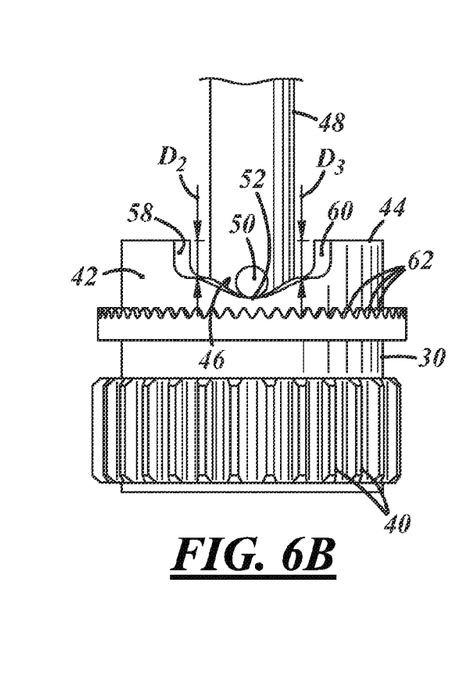
Figure 6C:
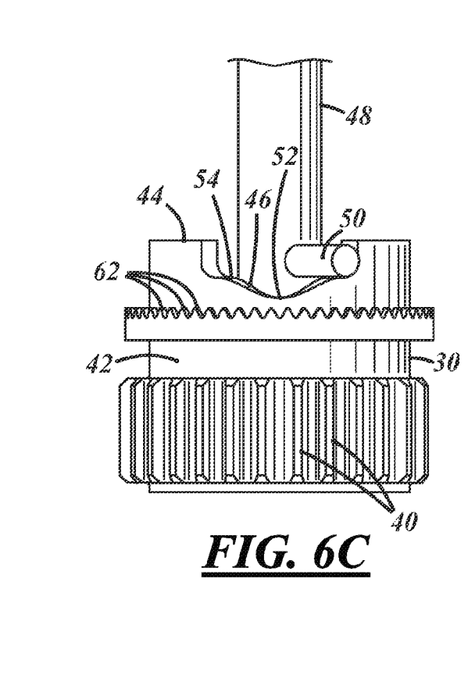

In end-to-end profile, and as perhaps depicted best by FIGS. 6A-6C, each recess 46 has a first depression 52, a second depression 54, and a third depression 56. The first depression 52 is situated between the second and third depressions 54, 56 with respect to a circumferential direction around the wall 42. To receive the prongs 50 as shown in FIG. 6B, the first depression 52 is sunk into the wall 42 to a first axial depth $D_1$. The first axial depth $D_1$ can be measured in relation to a non-recessed section of the open end 44, as shown in FIG. 6A, or could be measured with respect to an edge, surface, or some other reference point on the pin 48 or on another component. The second and third depressions 54, 56 are similar to each other and have respective side surfaces 58, 60 that delimit the circumferential extent of the recesses 46. To receive the prongs 50 as shown in FIGS. 6A and 6C, the second and third depressions 54, 56 are sunk into the wall 42 to a respective second axial depth $D_2$ and third axial depth $D_3$. The second and third axial depths $D_2$, $D_3$ can be measured in the same way as set forth above for the first axial depth $D_1$. Compared to the first axial depth $D_1$, the second and third axial depths $D_2$, $D_3$ have lengths that are less than that of the first axial depth $D_1$. And compared to each other, the second and third axial depths $D_2$, $D_3$ are substantially equal. The different axial depths produce different corresponding axial movements of the sun gear 30, as described below in greater detail. Indeed, the exact value selected for the axial depths may depend upon— among other possible influences—the length of teeth used for locking and unlocking the planetary gear set 14 and the desired speed at which locking and unlocking is to be carried out. In other embodiments not depicted in the figures, the recesses 46 could have two depressions with differing axial depths instead of three depressions.

Still referring to FIGS. 5 and 6A-6C, the sun gear 30 can have yet another set of teeth 62 that are used to lock and unlock the planetary gear set 14. These teeth 62, when provided, are discrete from the teeth 40. The teeth 62 can be designed and shaped as a set of splines or could have other designs and shapes, and in this sense the term "teeth" is used as a genus that encompasses different designs and shapes while the term "splines" is used as a species of that genus. The splines 62 can be situated at an exterior of the wall 42 and about midway on the wall and axially between the teeth 40 and the recesses 46. To connect the splines 62 to the wall 42, they can be press-fit, welded, adhered, bolted, or attached in another way. As presented by the embodiment of the figures, the individual splines are directed axially toward the open end 44.

Referring again to FIGS. 1-4, the planet gears 32 rotate about their individual rotational axes $X_2$ when in the midst of bringing the engine's camshaft among advanced and retarded angular positions. When not advancing or retarding, the planet gears 32 revolve together around the axis $X_1$ with the sun gear 30 and with the ring gears 34, 36. In the embodiment presented here, there are a total of three discrete planet gears 32 that are similarly designed and constructed with respect to one another, but there could be other quantities of planet gears such as two or four or six. However many there are, each of the planet gears 32 can engage with both of the first and second ring gears 34, 36, and each planet gear can have a set of teeth 64 at its exterior for making direct teeth-to-teeth meshing with the ring gears. In different examples, the teeth 64 can include twenty-one individual teeth, or some other quantity of teeth spanning continuously around the circumference of each of the planet gears 32.

Figure 1:
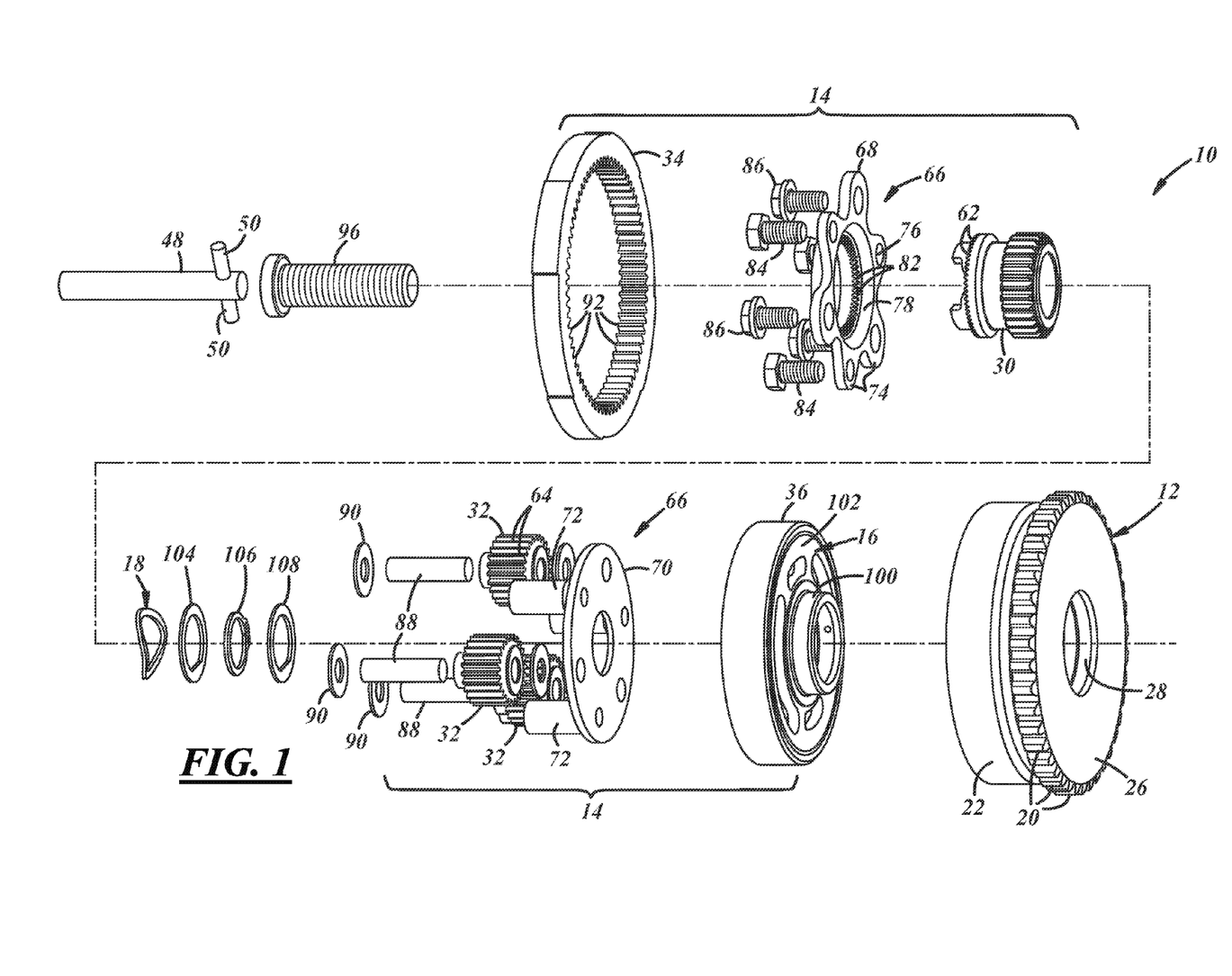
FIG. 1 is an exploded view of an embodiment of an engine variable camshaft timing phaser, the exploded view taken from a front perspective.
Figure 2:
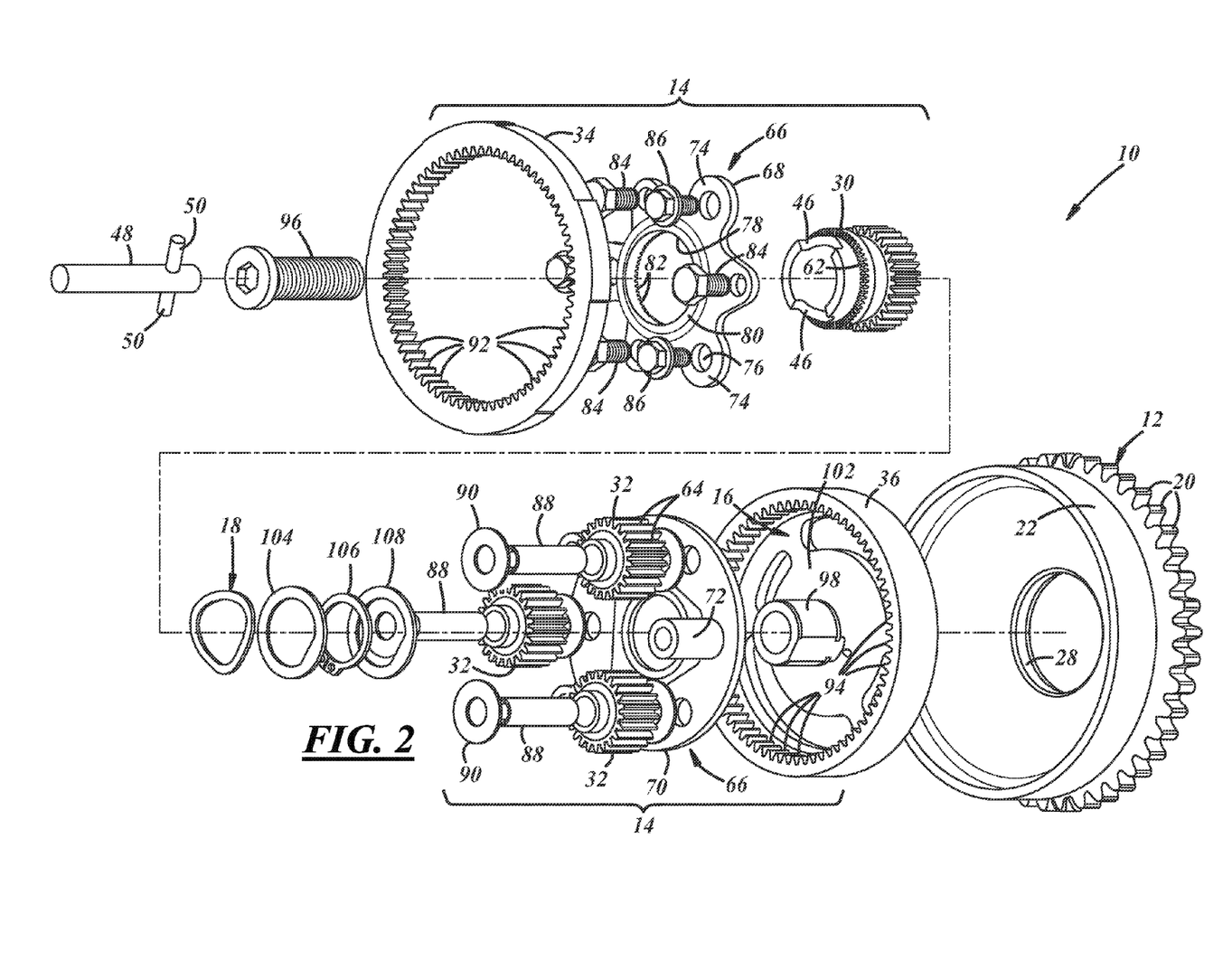
FIG. 2 is an exploded view of the engine variable camshaft timing phaser of FIG. 1, the exploded view taken from a rear perspective.
Figure 3:
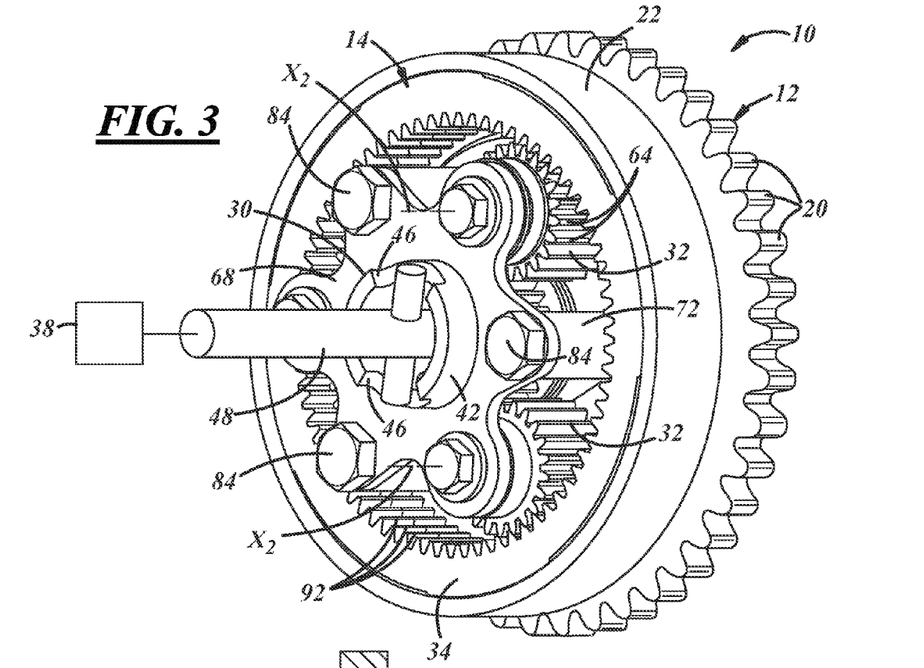
FIG. 3 is a perspective view of the engine variable camshaft timing phaser of FIG. 1, the engine variable camshaft timing phaser assembled together.

To hold the planet gears 32 in place and support them, a carrier assembly 66 can be provided. The carrier assembly 66 can have different designs and constructions. In the embodiment presented in the figures, the carrier assembly 66 includes a top or first carrier plate 68 at one end, a bottom or second carrier plate 70 at the other end, and cylinders 72 for making a connection between the carrier plates. The first plate 68 is perhaps illustrated best in FIG. 5. It has several tabs 74 disposed around its periphery, with each of the tabs including holes 76. A central opening 78 is defined in part by a rim 80. The first plate 68 has a set of teeth 82 for mating and unmating with the teeth 62 of the sun gear 30 and hence locking and unlocking the planetary gear set 14. As before, the teeth 82 can be designed and shaped as a set of splines. The splines 82 can be situated at an interior of the rim 80 and can be connected to the rim by press-fitting, welding, adhering, bolting, or via attachment in another way. The splines 82 could be situated at other locations, including at the second plate 70; indeed, its exact location may be dictated by the location of the splines 62 and its ability to mate and unmate with them. As presented by the embodiment of the figures, the individual splines 82 are directed axially toward the splines 62 and are designed and constructed in a corresponding manner so that the sets of splines fix together when mated. Referring now to FIGS. 1 and 2, the second plate 70 and cylinders 72 can be unitary or separate parts. Bolts 84 fasten with internal threads of the cylinders 72, and bolts 86 fasten with pins 88 that mount the planet gears 32 and serve as a hub for the gears' rotation. Lastly, washers 90 can be used with the carrier assembly 66.

The first ring gear 34 can be connected to the sprocket 12 so that the first ring gear and sprocket rotate together about the axis $X_1$ in operation. The connection can be made in different ways, including by a cutout-and-tab interconnection, press-fitting, welding, adhering, riveting, bolting, or by another technique. Still, the first ring gear 34 and sprocket 12 could make up a monolithic component and need not be discrete components as depicted in the figures. In assembly, and as perhaps shown best in FIG. 4, the first ring gear 34 is located on the inside of the sprocket's skirt 22 and against the step 24. The first ring gear 34 has an annular shape, engages with the planet gears 32, and has a set of teeth 92 at its interior for making direct teeth-to-teeth meshing with the planet gears. In different examples, the teeth 92 can include eighty individual teeth, or some other quantity of teeth spanning continuously around the circumference of the first ring gear 34. In the embodiment presented here, the first ring gear 34 is an internal spur gear, but could be another type of gear.

Figure 4:
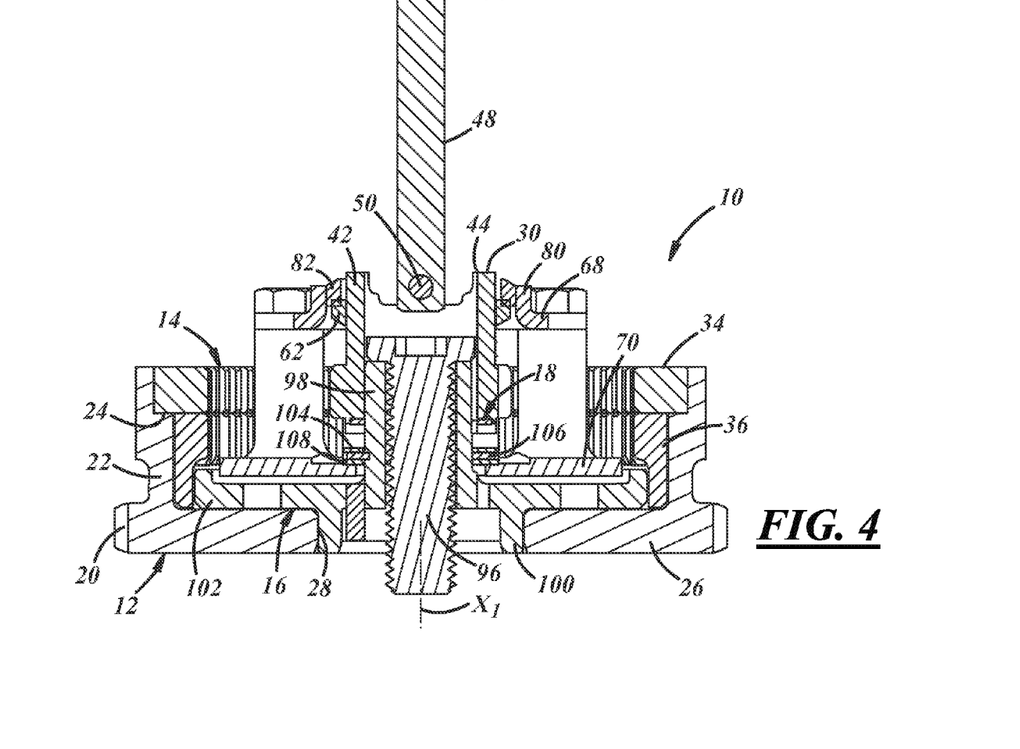
FIG. 4 is a sectional view of the engine variable camshaft timing phaser of FIG. 1.
Figure 5:
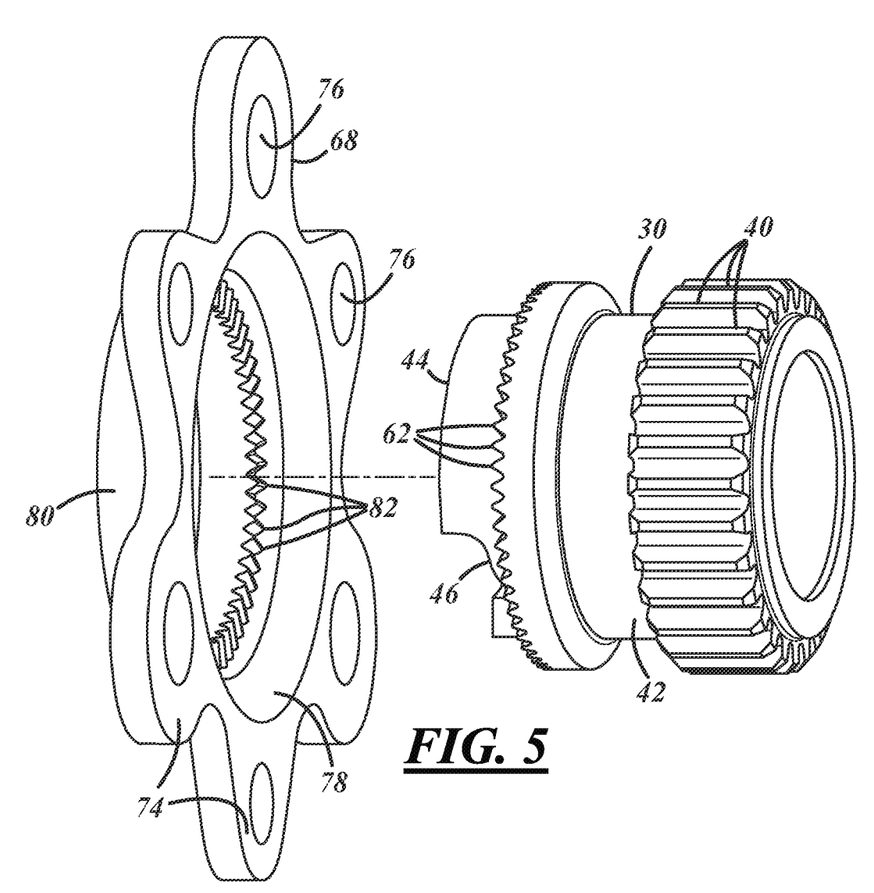
FIG. 5 is an enlarged view of an embodiment of a sun gear and a carrier of the engine variable camshaft timing phaser of FIG. 1.

The second ring gear 36 transmits rotational drive output to the engine's camshaft about the axis $X_1$. Referring to FIGS. 1, 2, and 4, in this embodiment the second ring gear 36 drives rotation of the camshaft via the plate 16. The second ring gear 36 and plate 16 can be connected together in different ways, including by a cutout-and-tab interconnection, press-fitting, welding, adhering, bolting, or by another technique. Like the first ring gear 34, the second ring gear 36 is located on the inside of the sprocket's skirt 22 but closer to the sprocket's front wall 26 and closer to the engine's camshaft. The second ring gear 36 has an annular shape, engages with the planet gears 32, and has a set of teeth 94 at its interior for making direct teeth-to-teeth meshing with the planet gears. In different examples, the teeth 94 can include seventy-seven individual teeth, or some other quantity of teeth spanning continuously around the circumference of the second ring gear 36. With respect to each other, the number of teeth between the first and second ring gears 34, 36 can differ by a multiple of the number of planet gears 32 provided. So for instance, the teeth 92 can include eighty individual teeth, while the teeth 94 can include seventy-seven individual teeth—a difference of three individual teeth for the three planet gears 32 in this example. In another example with six planet gears, the teeth 92 could include seventy individual teeth, while the teeth 94 could include eighty-two individual teeth. Satisfying this relationship furnishes the advancing and retarding capabilities by imparting relative rotational movement and relative rotational speed between the first and second ring gears 34, 36 in operation. In the embodiment presented here, the second ring gear 36 is an internal spur gear, but could be another type of gear.

Together, the two ring gears 34, 36 constitute a split ring gear construction for the planetary gear set 14. Still, the planetary gear set 14 could include more than two ring gears. For instance, the planetary gear set 14 could include an additional third ring gear for a total of three ring gears. Here, the third ring gear could also transmit rotational drive output to the engine's camshaft like the second ring gear 36, and could have the same number of individual teeth as the second ring gear.

The plate 16 is connected directly to the engine's camshaft and is driven for rotation by its connection with the second ring gear 36. Still referring to FIGS. 1, 2, and 4, the connection between the plate 16 and camshaft can be made in different ways, including by way of a bolt 96. In this embodiment, the plate 16 has a first sleeve 98, a second sleeve 100, and a flange 102. The first sleeve 98 is a cylindrical wall that is inserted partially into the wall 42 of the sun gear 30 and that receives the bolt 96. The first sleeve 98 and wall 42 can be slightly spaced apart from each other so they can independently rotate. The second sleeve 100 fits into the central opening 28 of the sprocket 12 and pilots the plate 16 and sprocket together. And the flange 102 resembles a disk and spans radially outboard to meet the second ring gear 36 for a connection therebetween.

The spring 18 exerts a biasing force to the sun gear 30 and urges the sun gear in an axial direction toward the pin 48. In the embodiment here, the spring 18 is inserted over the exterior of the plate's first sleeve 98 and is located axially between a terminal end of the sun gear 30 and the plate's flange 102. For its installation, a thrust washer 104, a snap ring 106, and a locating washer 108 can be provided. As illustrated in FIGS. 1, 2, and 4, the thrust washer 104 is inserted over the first sleeve 98, and the snap ring 106 is fixed to the first sleeve by a groove at the exterior of the first sleeve. The locating washer 108 is also inserted over the first sleeve 98, but axially between the snap ring 106 and the flange 102. With this assembly, the spring 18 can be located immediately between the sun gear 30 and thrust washer 104. Since the snap ring 106 is fixed in place, the spring 18 is urged toward the terminal end of the sun gear 30. The spring 18 exerts an axially-directed biasing force to the sun gear 30 via abutment between the spring and thrust washer 104. Still, other assemblies are possible including those that do not necessarily involve a snap ring and washers.

In the embodiment of the figures, the spring 18 is a single wave spring. In specific examples, the wave spring 18 can exhibit a spring rate that ranges between approximately 5.7 newtons/millimeter (N/mm) and 5.9 N/mm, or more specifically can be approximately 5.77 N/mm, 5.80 N/mm, or 5.83 N/mm. And when the planetary gear set 14 is in the locked condition, the wave spring 18 can exert a biasing force that ranges between approximately 6 N to 30 N. Yet additional spring rates and biasing forces are possible for the spring 18, and the exact values may depend on the particular application in which the phaser 10 is used. In other embodiments, the spring 18 could be a different type of spring and could have different arrangements. For example, the spring 18 could be a Belleville spring or one or more coil springs. In the case of the coil springs, a single coil spring could be inserted over the first sleeve 98, or multiple coil springs could be arranged around the outside of the first sleeve, to cite some examples.

When put in use, the phaser 10 transfers rotation from the engine crankshaft and to the engine camshaft, and, when commanded by a controller, can angularly displace the camshaft to an advanced angular position and to a retarded angular position. Without camshaft advancing or retarding, the sprocket 12 is driven to rotate about the axis $X_1$ by the engine crankshaft in a first direction (e.g., clockwise or counterclockwise) and at a first rotational speed. Since the first ring gear 34 is connected to the sprocket 12, the first ring gear also rotates in the first direction and at the first rotational speed. Concurrently, the electric motor 38 drives the sun gear 30 to rotate about the axis Xi in the first direction and at the first rotational speed. Under these conditions, the sprocket 12, sun gear 30, first and second ring gears 34, 36, and plate 16 all rotate together in unison in the first direction and at the first rotational speed. Also, the planet gears 32 revolve together around the axis $X_1$ in the first direction and at the first rotational speed, and do not rotate about their individual rotational axes $X_2$. Put differently, there is no relative rotational movement or relative rotational speed among the sprocket 12, sun gear 30, planet gears 32, ring gears 34, 36, and plate 16 while not advancing or retarding the camshaft. Due to this lack of relative rotational movement and speed, frictional losses that may otherwise occur between the gears are minimized or altogether eliminated.

In this example, in order to advance the angular position of the engine camshaft, the electric motor 38 drives the sun gear 30 at a second rotational speed that is slower than the first rotational speed of the sprocket 12. This creates relative rotational speed and relative rotational movement between the sun gear 30 and the sprocket 12. And because the first and second ring gears 34, 36 have a different number of individual teeth in relation to each other, the first ring gear moves rotationally relative to the second ring gear. At the same time, the planet gears 32 rotate about their individual rotational axes $X_2$. The exact duration of driving the sun gear 30 at the second rotational speed will depend on the desired degree of angular displacement between the engine camshaft and sprocket 12. Once the desired degree is effected, the electric motor 38 will once again be commanded to drive the sun gear 30 at the first rotational speed. Furthermore, while advancing the angular position, the prongs 50 of the pin 48 move to the second depression 54 and are seated therein against the side surface 58—this is depicted in FIG. 6A. The sun gear 30 moves along the axis $X_1$ toward the engine's camshaft and away from the pin 48. The splines 62 of the sun gear 30 slide away from the splines 82 of the first plate 68; they separate and become unmated from each other whereby the sun gear and first plate are not directly coupled via the splines. The planetary gear set 14 is thereby in its unlocked condition. The somewhat ramped transition leading to the second depression 54 promotes ready movement by the prongs 50 to the second depression. In this embodiment, only the sun gear 30 moves axially while the other components of the planetary gear set 14 do not move axially.

Conversely, in order to retard the angular position of the engine camshaft, the electric motor 38 drives the sun gear 30 at a third rotational speed that is faster than the first rotational speed. Relative rotational speeds and movements are once again created between the sun gear 30 and sprocket 12, and the first gear 34 moves rotationally relative to the second gear 36. And as before, the planet gears 32 rotate about their individual rotational axes $X_2$. Furthermore, while retarding the angular position, the prongs 50 of the pin 48 move to the third depression 56 and are seated therein against the side surface 60—this is depicted in FIG. 6C. Once again, the sun gear 30 moves along the axis $X_1$ toward the engine's camshaft and away from the pin 48. The splines 62 of the sun gear 30 slide away from the splines 82 of the first plate 68; they separate and become unmated from each other whereby the sun gear and first plate are not directly coupled via the splines. The planetary gear set 14 is thereby in its unlocked condition. Because the second and third axial depths $D_2$, $D_3$ are substantially equal, the sun gear 30 slides for the same axial distance and to the same axial position when advancing and retarding, although this need not always be the case.

The planetary gear set 14 can be brought to the locked condition when the angular position of the engine's camshaft is not advancing and not retarding. In the locked condition, the sprocket 12, sun gear 30, first and second ring gears 34, 36, and plate 16 all rotate together in unison and without relative rotational movement and without relative rotational speed among them. The locked condition is established when relative rotational movement is prevented between two components of the planetary gear set 14. The locked condition is sometimes desirable when the accompanying engine is shutdown. Without locking capabilities, a behavior known as "drift" has been observed in which the engine's camshaft tends to rotate from its angular position at shutdown. Drift can be caused, for instance, by spring forces exerted to camshaft lobes when the engine is turned off; still, other circumstances may rotate the camshaft at shutdown. This may hinder certain engine operating strategies that rely on knowledge of a camshaft's angular position upon engine start-up. An example are strategies employed for some start/stop technologies where an engine is momentarily shutdown when idling at a red traffic light and then re-started when the traffic light turns green and the gas pedal is depressed. The phaser 10 and its locked condition preclude drift behavior and other unwanted camshaft rotations at engine shutdown. When turned off, the biasing force exerted by the spring 18 prompts the prongs 50 of the pin 48 to move into the first depression 52—this is depicted in FIG. 6B. Coming from the second or third depressions 54, 56, the sun gear 30 moves along the axis $X_1$ toward the pin 48 and away from the engine's camshaft. The splines 62 of the sun gear 30 slide toward the splines 82 of the first plate 68 and the two sets of splines mate with each other. When the sun gear 30 and first plate 68 are secured in this manner, the planetary gear set 14 and its components are consequently rotationally locked together. The planetary gear set 14 is thereby in its locked condition. The somewhat ramped transitions leading to the first depression 52 on both of its sides promotes ready movement by the prongs 50 into the first depression in response to the exerted biasing force.

Still, the phaser 10 can have different designs and constructions than detailed in this description and illustrated in the figures. For instance, bringing the planetary gear set 14 to the locked condition could be effected in various ways. Rather than providing the separate set of teeth 62 at the sun gear 30, the teeth 40 could be purposed for engaging both the teeth 64 of the planet gears 32 and the teeth 82 of the first plate 68; for this, the teeth 40 could have an increased axial extent or some other modification compared to how its design is presented in the figures. Further, the locked condition need not necessarily involve both the sun gear 30 and the carrier assembly 66, and instead could involve other components of the planetary gear set (14). For example, the set of splines at the first plate could be omitted and instead a set of splines could be connected to one of the ring gears, with the sun gear still having its set of splines; in this case, one of the sets of splines would have to extend to the other for mating. When the splines of the ring gear and sun gear are mated together, as before, the planetary gear set and its components are consequently rotationally locked together.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. An engine variable camshaft timing phaser (10), comprising:
    a sprocket (12) receiving rotational drive input from an engine crankshaft;
    a planetary gear set (14) comprising:
        at least two ring gears (34, 36), one of said at least two ring gears (34, 36) receiving rotational drive input from said sprocket (12) and one of said at least two ring gears (34, 36) transmitting rotational drive output to an engine camshaft;
        a plurality of planet gears (32) engaged with said at least two ring gears (34, 36);
        a sun gear (30) engaged with said plurality of planet gears (32) and driven by an electric motor (38);
        a first set of teeth (82); and
        a second set of teeth (40, 62);
    wherein, in order to bring said planetary gear set (14) to a locked condition, said first set of teeth (82) and said second set of teeth (40, 62) are mated with each other.

2. The engine variable camshaft timing phaser (10) as set forth in claim 1, further comprising a carrier plate (68, 70), said carrier plate (68, 70) has said first set of teeth (82) and said sun gear (30) has said second set of teeth (40, 62), and when said first set of teeth (82) and said second set of teeth (40, 62) mate with each other, said carrier plate (68, 70) and said sun gear (30) rotate together and said planetary gear set (14) is in the locked condition.

3. The engine variable camshaft timing phaser (10) as set forth in claim 1, wherein, when the engine variable camshaft timing phaser (10) is in a non-advancing and non-retarding state, said sun gear (30) is at a first axial position along its axis and said first set of teeth (82) and said second set of teeth (40, 62) are mated with each other, and when the engine variable camshaft timing phaser (10) is in an advancing or retarding state, said sun gear (30) is at a second axial position along its axis and said first set of teeth (82) and said second set of teeth (40, 62) are unmated from each other.

4. The engine variable camshaft timing phaser (10) as set forth in claim 3, further comprising a spring (18) biasing said sun gear (30) to said first axial position.

5. The engine variable camshaft timing phaser (10) as set forth in claim 3, wherein a pin-and-recess interconnection between said sun gear (30) and the electric motor (38) and relative rotational speeds between said sun gear (30) and the electric motor (38) causes axial movement of said sun gear (30) between said first and second axial positions.

6. The engine variable camshaft timing phaser (10) as set forth in claim 5, wherein said pin-and-recess interconnection includes a recess (46) located in a wall (42) of said sun gear (30) and a pin (48) extending from the electric motor (38).

7. The engine variable camshaft timing phaser (10) as set forth in claim 6, wherein said recess (46) has a first depression (52), a second depression (54), and a third depression (56), when said pin (48) is seated in said first depression (52) said sun gear (30) is at said first axial position, when said pin (48) is seated in said second depression (54) said sun gear (30) is at said second axial position, and when said pin (48) is seated in said third depression (56) said sun gear (30) is at said second axial position.

8. The engine variable camshaft timing phaser (10) as set forth in claim 1, wherein said first set of teeth (82) are a first set of splines (82), said second set of teeth (40, 62) are a second set of splines (62), said second set of splines (62) are discrete from a set of teeth (40) of said sun gear (30) that mesh with sets of teeth (64) of said plurality of planet gears (32).

9. An engine variable camshaft timing phaser (10), comprising:
    a sprocket (12) receiving rotational drive input from an engine crankshaft;
    at least two ring gears (34, 36), one of said at least two ring gears (34, 36) receiving rotational drive input from said sprocket (12) and one of said at least two ring gears (34, 36) transmitting rotational drive output to an engine camshaft;
    a plurality of planet gears (32) engaged with said at least two ring gears (34, 36);
    a carrier plate (68, 70) supporting said plurality of planet gears (32), said carrier plate (68, 70) having a first set of teeth (82); and
    a sun gear (30) engaged with said plurality of planet gears (32) and driven by an electric motor (38), said sun gear (30) having a second set of teeth (40, 62), said sun gear (30) and the electric motor (38) having a pin-and-recess interconnection between them, said recess (46) having a first axial depth ($D_1$) and having a second axial depth ($D_2$, $D_3$);
    wherein, when the engine variable camshaft timing phaser (10) is in a non-advancing and non-retarding state, said first set of teeth (82) and said second set of teeth (40, 62) are mated with each other and said pin (48) is situated at said first axial depth ($D_1$) of said recess (46), and when the engine variable camshaft timing phaser (10) is in an advancing or retarding state, said first set of teeth (82) and said second set of teeth (40, 62) are unmated from each other and said pin (48) is situated at said second axial depth ($D_2$, $D_3$) of said recess (46).

10. The engine variable camshaft timing phaser (10) as set forth in claim 9, further comprising a spring (18) biasing said pin (48) and said recess (46) together.

11. The engine variable camshaft timing phaser (10) as set forth in claim 9, wherein when said pin (48) is situated at said first axial depth ($D_1$) of said recess (46) said sun gear (30) is at a first axial position along its axis, and when said pin (48) is situated at said second axial depth ($D_2$, $D_3$) of said recess (46) said sun gear (30) is at a second axial position along its axis.

12. The engine variable camshaft timing phaser (10) as set forth in claim 9, wherein said recess (46) is located in a wall (42) of said sun gear (30) and said pin (48) extends from the electric motor (38).

13. The engine variable camshaft timing phaser (10) as set forth in claim 9, wherein said recess (46) has a third axial depth ($D_3$), when said pin (48) is situated at said third axial depth ($D_3$) the engine variable camshaft timing phaser (10) is in the other of the advancing or retarding state compared to when said pin (48) is situated at said second axial depth (D₂), and when said pin (48) is situated at said third axial depth (D₃) said first set of teeth (82) and said second set of teeth (40, 62) are unmated from each other.

14. The engine variable camshaft timing phaser (10) as set forth in claim 9, wherein said first set of teeth (82) are a first set of splines (82), said second set of teeth (40, 62) are a second set of splines (62), said second set of splines (62) are discrete from a set of teeth (40) of said sun gear (30) that mesh with sets of teeth (64) of said plurality of planet gears (32).

15. An engine variable camshaft timing phaser (10), comprising:
   a sprocket (12) receiving rotational drive input from an engine crankshaft;
   at least two ring gears (34, 36), one of said at least two ring gears (34, 36) receiving rotational drive input from said sprocket (12) and one of said at least two ring gears (34, 36) transmitting rotational drive output to an engine camshaft;
   a plurality of planet gears (32) engaged with said at least two ring gears (34, 36);
   a first set of teeth (82);
   a sun gear (30) engaged with said plurality of planet gears (32) and driven by an electric motor (38), said sun gear (30) having a second set of teeth (40, 62), said sun gear (30) having a wall (42) with a recess (46) located therein, said recess (46) having a first depression (52), a second depression (54), and a third depression (56), when a pin (48) of the electric motor (38) is seated in said first depression (52) said sun gear (30) is at a first axial position along its axis and said first set of teeth (82) and said second set of teeth (40, 62) are mated with each other, when the pin (48) is seated in said second depression (54) said sun gear (30) is at a second axial position along its axis and said first set of teeth (82) and said second set of teeth (40, 62) are unmated from each other, and when the pin (48) is seated in said third depression (56) said sun gear (30) is at the second axial position along its axis and said first set of teeth (82) and said second set of teeth (40, 62) are unmated from each other; and
   a spring (18) biasing said sun gear (30) toward the pin (48) of the electric motor (38).

* * * * *